US007472952B2

(12) United States Patent
Nakhla et al.

(10) Patent No.: US 7,472,952 B2
(45) Date of Patent: *Jan. 6, 2009

(54) SAFETY SEAT

(75) Inventors: Said Nakhla, Clarkston, MI (US); Pankaj Tulsidas Amesar, Charlotte, NC (US)

(73) Assignee: Britax Child Safety, Inc., Charlotte, NC (US)

( * ) Notice: Subject to any disclaimer, the term of this patent is extended or adjusted under 35 U.S.C. 154(b) by 89 days.

This patent is subject to a terminal disclaimer.

(21) Appl. No.: 11/223,502

(22) Filed: Sep. 9, 2005

(65) Prior Publication Data

US 2007/0057544 A1 Mar. 15, 2007

(51) Int. Cl.
*B60N 2/42* (2006.01)
(52) U.S. Cl. .................................. 297/216.11
(58) Field of Classification Search .............. 297/250.1, 297/216.11, 471, 472, 216.13, 484, 470, 297/216.14
See application file for complete search history.

(56) References Cited

U.S. PATENT DOCUMENTS

| 3,791,694 | A | * | 2/1974 | Roberts et al. ........... 297/250.1 |
| 3,910,634 | A | * | 10/1975 | Morris ........................ 297/467 |
| 5,294,183 | A | * | 3/1994 | Wetter et al. ................. 297/472 |
| 6,871,908 | B2 | * | 3/2005 | Takizawa ................ 297/216.11 |
| 7,083,237 | B2 | * | 8/2006 | Horton et al. ................. 297/471 |
| 2004/0095004 | A1 | | 5/2004 | Horton et al. | |

FOREIGN PATENT DOCUMENTS

EP 1167114 A1 6/2001

* cited by examiner

*Primary Examiner*—Milton Nelson, Jr.
(74) *Attorney, Agent, or Firm*—Adams Intellectual Property Law, P.A.

(57) ABSTRACT

A seat for providing an improved level of protection to a child by reducing the amount of force restraining straps exert upon the child during a collision. The seat includes a seat frame and a cover positioned over the seat frame to provide comfort to a seat occupant. The seat frame includes a seat back with a slot for receiving a strap for restraining a seat occupant and an energy absorbing member. The energy absorbing member reduces the amount of force applied by the strap to the seat occupant during a sudden deceleration of the seat.

12 Claims, 18 Drawing Sheets

SAFETY SEAT

TECHNICAL FIELD AND BACKGROUND OF THE INVENTION

This invention relates to safety seats for conveyances, such as vehicles. The invention has particular application as a safety seat for children, and is intended to provide an improved level of protection to the child by reducing the amount of force the restraining straps exert upon the child during a collision.

Conventional child safety seats have restraining straps that hold the child in place. In the event of an accident, the restraining straps exert a restraining force upon the child to hold the child securely in place and prevent the child from moving forward. While it is important to hold the child securely in place, the child can possibly sustain injury as a result of the significant force the restraining straps apply to the upper body of the child during a sudden stop or deceleration. Children are especially vulnerable to forces applied to their upper bodies because their heads are relatively heavy compared to the rest of their body. Children also have relatively weak necks with soft bones and stretchy ligaments making them more susceptible to injury. Conventional child safety seats have no specific mechanism to dissipate energy or force exerted upon the child during a collision. As such, there is a need for a child safety seat that reduces the amount of force applied to the child by the restraining straps during a sudden deceleration.

The safety seat of the present invention includes an energy-absorbing feature that reduces the load applied to the child in a collision or during a sudden stop or deceleration. The energy absorbing feature of this invention helps absorb shock and lessen the potential injury to the head and chest of the child, the parts of the body most vulnerable in a collision.

SUMMARY OF THE INVENTION

Therefore, it is an object of the invention to provide a child seat that reduces the amount of force applied to the child by the restraining straps.

It is another object of the invention to provide a child seat that secures a child in the seat.

It is another object of the invention to provide a child seat with an energy-absorbing member.

These and other objects of the present invention are achieved in the preferred embodiments disclosed below by providing a seat including a seat frame having a seat back and an energy absorbing member. The seat back includes a slot for receiving a strap for restraining a seat occupant. The energy absorbing member is operatively associated with the slot and reduces the amount of force applied by the strap to the seat occupant during a sudden deceleration of the seat.

According to one preferred embodiment of the invention, the energy absorbing member includes an elongate weakness area extending from a bottom edge of the slot, and adapted for progressive separation during a sudden deceleration to allow the strap to move forward, at a controlled rate, a predetermined distance during the sudden deceleration of the seat.

According to another preferred embodiment of the invention, the energy absorbing member is positioned between a rearward side of the seat frame and the strap. The energy absorbing member includes a crushable material adapted for progressive crushing during a sudden deceleration to allow the strap to move forward, at a controlled rate, a predetermined distance during the sudden deceleration of the seat.

According to another preferred embodiment of the invention, the energy absorbing member is mounted on the rearward side of the seat frame adjacent to the slot.

According to another preferred embodiment of the invention, the seat back includes a plurality of slots positioned substantially vertically from a bottom of the seat back to a top of the seat back for receiving the strap.

According to another preferred embodiment of the invention, the seat frame includes a plurality of energy absorbing members. Each of the energy absorbing members are positioned on the seat back adjacent to a respective one of the plurality of slots.

According to another preferred embodiment of the invention, the plurality of energy absorbing members include an area of reduced resistance to application of a force extending from a bottom edge of the slot, and adapted for separation from the seat back during a sudden deceleration to allow the strap to move forward, at a controlled rate, a predetermined distance during the sudden deceleration of the seat.

According to another preferred embodiment of the invention, the plurality of energy absorbing members decrease in size from the bottom of the seat back to the top of the seat back.

According to another preferred embodiment of the invention, the plurality of energy absorbing members decrease in energy absorbing capacity from the bottom of the seat back to the top of the seat back.

According to another preferred embodiment of the invention, the energy absorbing members are positioned between a rearward side of the seat frame and the strap. The energy absorbing members include a crushable material adapted for progressive crushing during a sudden deceleration to allow the strap to gradually move forward a predetermined distance during the sudden deceleration of the seat.

According to another preferred embodiment of the invention, the seat frame includes a plurality of energy absorbing members. Each of the energy absorbing members are positioned on the rearward side of the seat back adjacent to a respective one of the plurality of slots.

According to another preferred embodiment of the invention, the plurality of energy absorbing members decrease in energy absorbing capacity from the bottom of the seat back to the top of the seat back.

According to another preferred embodiment of the invention, the seat back includes a bottom pair of slots, an intermediate pair of slots positioned above the bottom pair of slots, and a top pair of slots positioned above the intermediate pair of slots. The seat back also includes a first pair of energy absorbing members positioned adjacent the bottom pair of slots, and a second pair of energy absorbing members positioned adjacent the intermediate pair of slots.

According to another preferred embodiment of the invention, the first pair of energy absorbing members have greater energy absorbing capacity than the second pair of energy absorbing members.

According to another preferred embodiment of the invention, a seat includes a seat frame having a seat back and a seat bottom. The seat back includes a plurality of slots positioned substantially vertically from a bottom of the seat back to a top of the seat back for receiving a strap for restraining a seat occupant. The seat frame further includes an energy absorbing member operatively associated with at least one of the plurality of slots for reducing the amount of force applied by the strap to the seat occupant during a sudden deceleration of the seat.

According to another preferred embodiment of the invention, the energy absorbing member includes an elongated weakness area extending from a bottom edge of the at least one of the plurality of slots, and adapted for progressive separation from the seat back during a sudden deceleration to allow the strap to move forward, at a controlled rate, a predetermined distance during the sudden deceleration of the seat.

According to another preferred embodiment of the invention, the energy absorbing member is positioned between a rearward side of the seat frame and the strap. The energy absorbing member includes a crushable material adapted for progressive crushing during a sudden deceleration to allow the strap to move forward, at a controlled rate, a predetermined distance during the sudden deceleration of the seat.

According to another preferred embodiment of the invention, a seat includes a seat frame having a seat back and a seat bottom. The seat back has an upper pair of slots, an intermediate pair of slots, and a bottom pair of slots for receiving a strap for restraining a seat occupant. The seat frame further includes a first pair of energy absorbing members operatively associated with the bottom pair of slots and a second pair of energy absorbing members operatively associated with the intermediate pair of slots to allow the strap to move forward, at a controlled rate, a predetermined distance during a sudden deceleration of the seat, thereby reducing the amount of force applied by the strap to the seat occupant. The first pair of energy absorbing members have a greater energy absorbing capacity than the second pair of energy absorbing members.

According to another preferred embodiment of the invention, the first and second pairs of energy absorbing members include an area of reduced resistance to application of a force extending from a bottom edge of the slot, and are adapted for separation from the seat back during a sudden deceleration to allow the strap to move forward, at a controlled rate, a predetermined distance during the sudden deceleration of the seat.

According to another preferred embodiment of the invention, the first and second pairs of energy absorbing members are positioned between a rearward side of the seat frame and the strap. The first and second pairs of energy absorbing members include a crushable material adapted for progressive crushing during a sudden deceleration to allow the strap to move forward, at a controlled rate, a predetermined distance during the sudden deceleration of the seat.

According to another preferred embodiment of the invention, a method for restraining a seat occupant includes the steps of providing a seat having a seat frame, a seat back, and a slot for receiving a strap; placing a seat occupant in the seat, and securing the seat occupant in the seat using the strap; and providing an energy absorbing member operatively associated with the slot for reducing the amount of force applied by the strap to the seat occupant during a sudden deceleration of the seat.

According to another preferred embodiment of the invention, the step of providing an energy absorbing member includes positioning a crushable material between the seat frame the strap, the crushable material adapted for progressive crushing during a sudden deceleration of the seat.

According to another preferred embodiment of the invention, the step of providing an energy absorbing member includes forming an elongated weakness area extending from a bottom edge of the slot and adapted for progressive separation from the seat back during a sudden deceleration of the seat.

BRIEF DESCRIPTION OF THE DRAWINGS

Some of the objects of the invention have been set forth above. Other objects and advantages of the invention will appear as the invention proceeds when taken in conjunction with the following drawings, in which.

DETAILED DESCRIPTION OF THE PREFERRED EMBODIMENT AND BEST MODE

Figure 1:
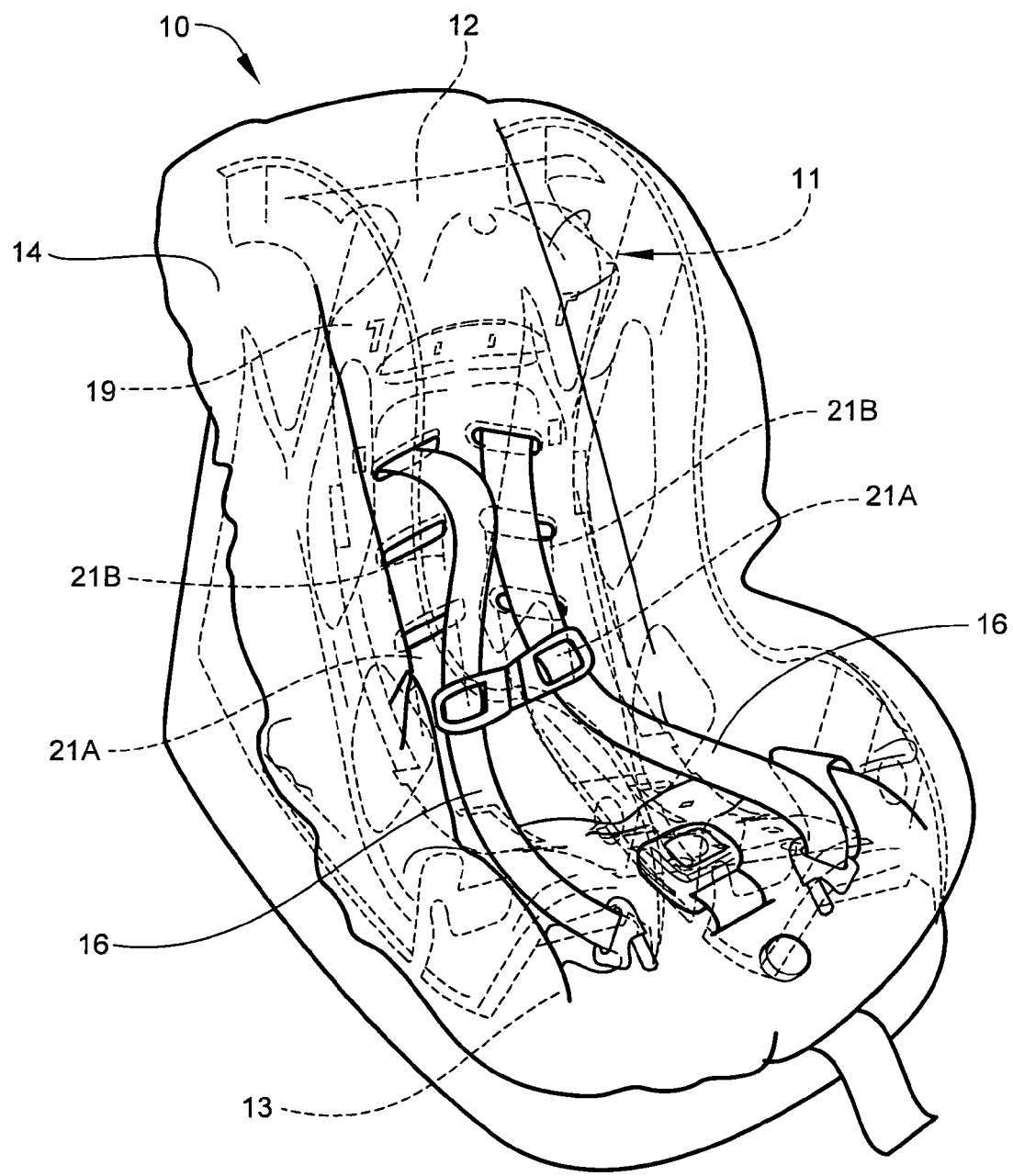
FIG. 1 is a perspective view of an energy absorbing child seat according to a preferred embodiment of the invention.
Figure 2:
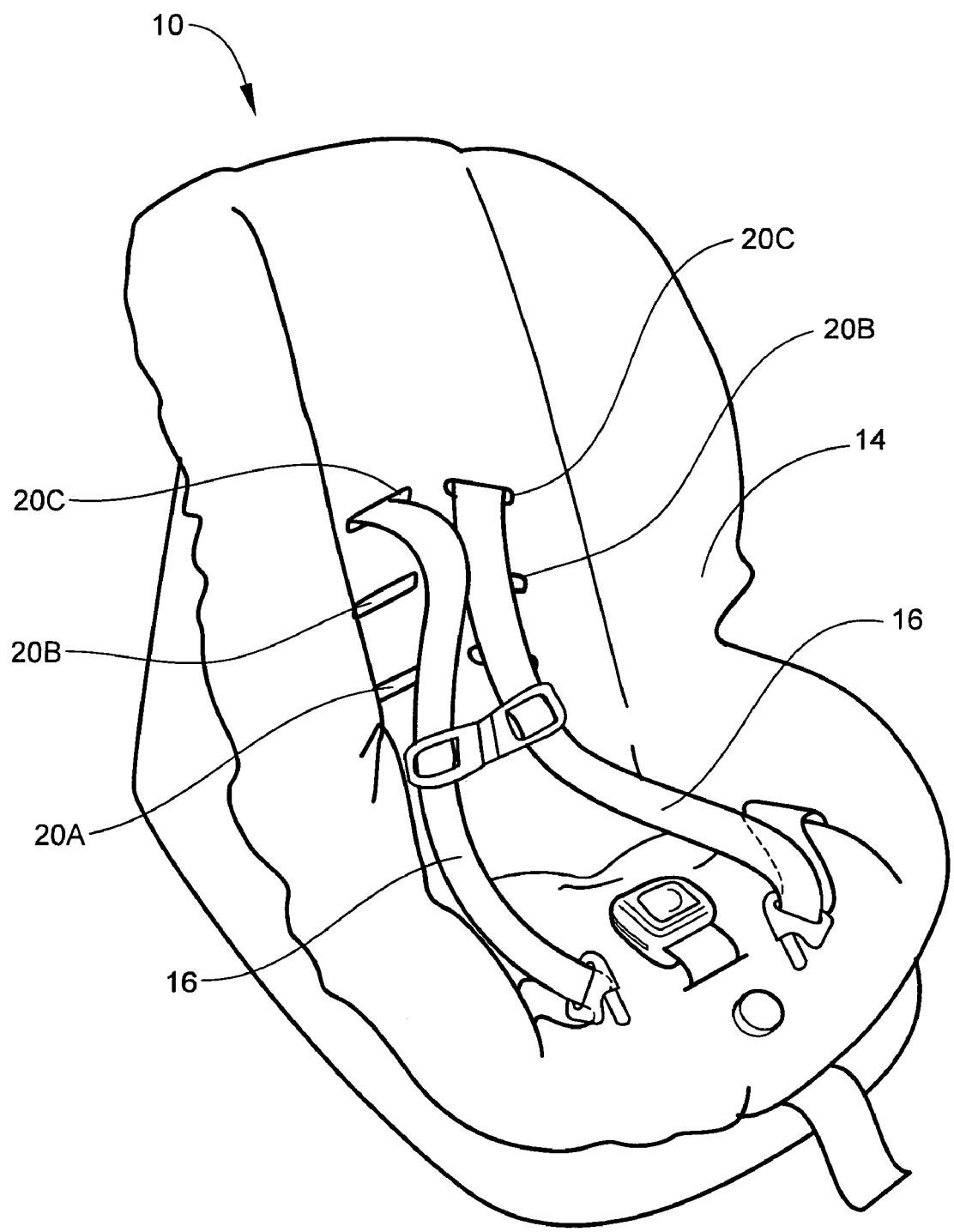
FIG. 2 is another perspective view of the energy absorbing seat of FIG. 1.

Referring now specifically to the drawings, an energy absorbing child safety seat according to a preferred embodiment of the invention is illustrated in FIGS. 1 and 2, and shown generally at reference numeral 10. The seat 10 is particularly for use in a vehicle, and generally comprises a seat frame 11 having a seat back 12 and a seat bottom 13 and energy absorbing members 21A, 21B. A restraining harness, such as straps 16, passes through the seat back 12 and is connected to the seat frame 11 for restraining a seat occupant within the seat. A cover 14 including suitable padding is positioned over the seat frame 11 to provide comfort to a seat occupant.

Figure 3:
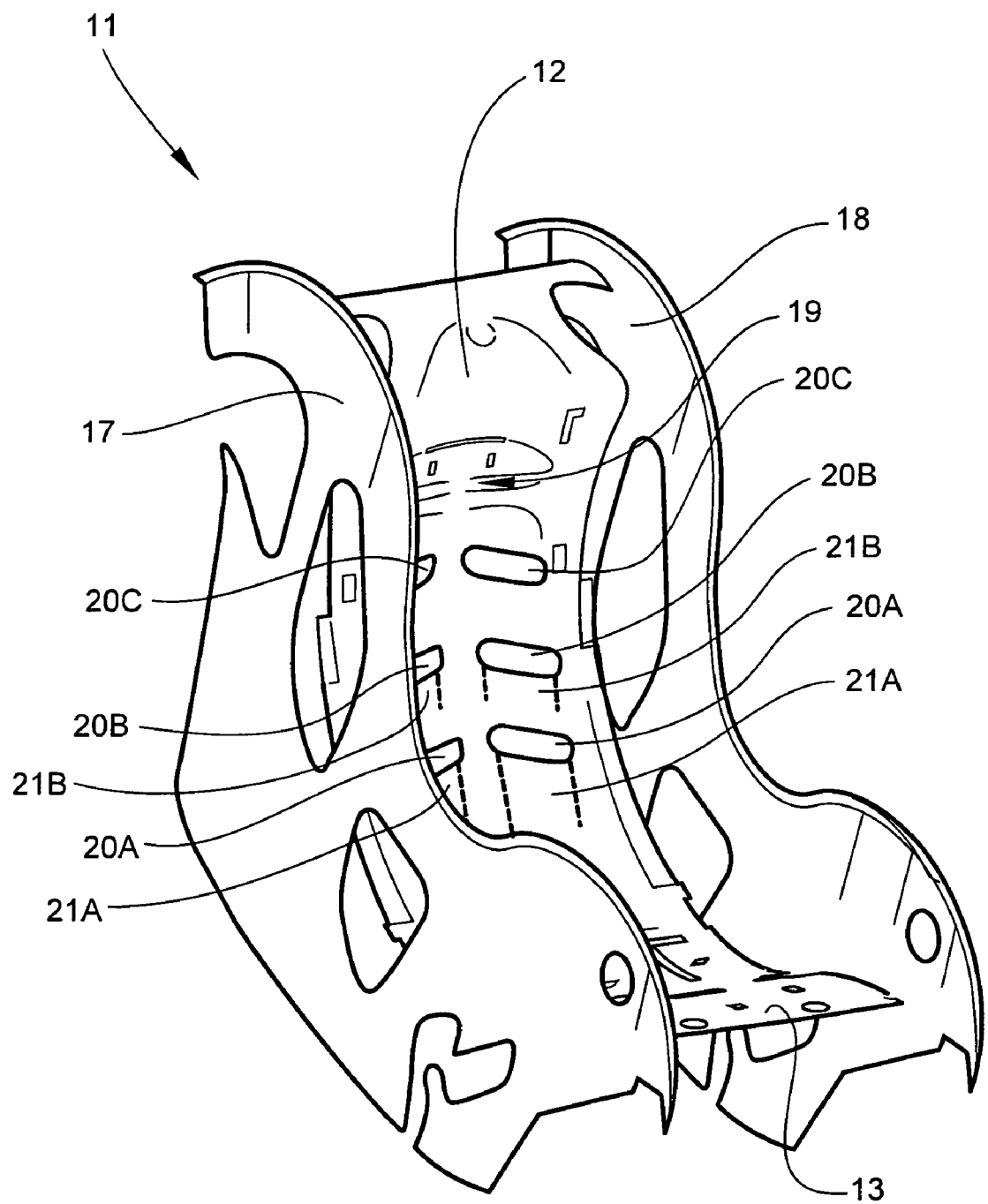
FIG. 3 is a perspective view of a seat frame of the energy absorbing seat of FIG. 1.
Figure 4:
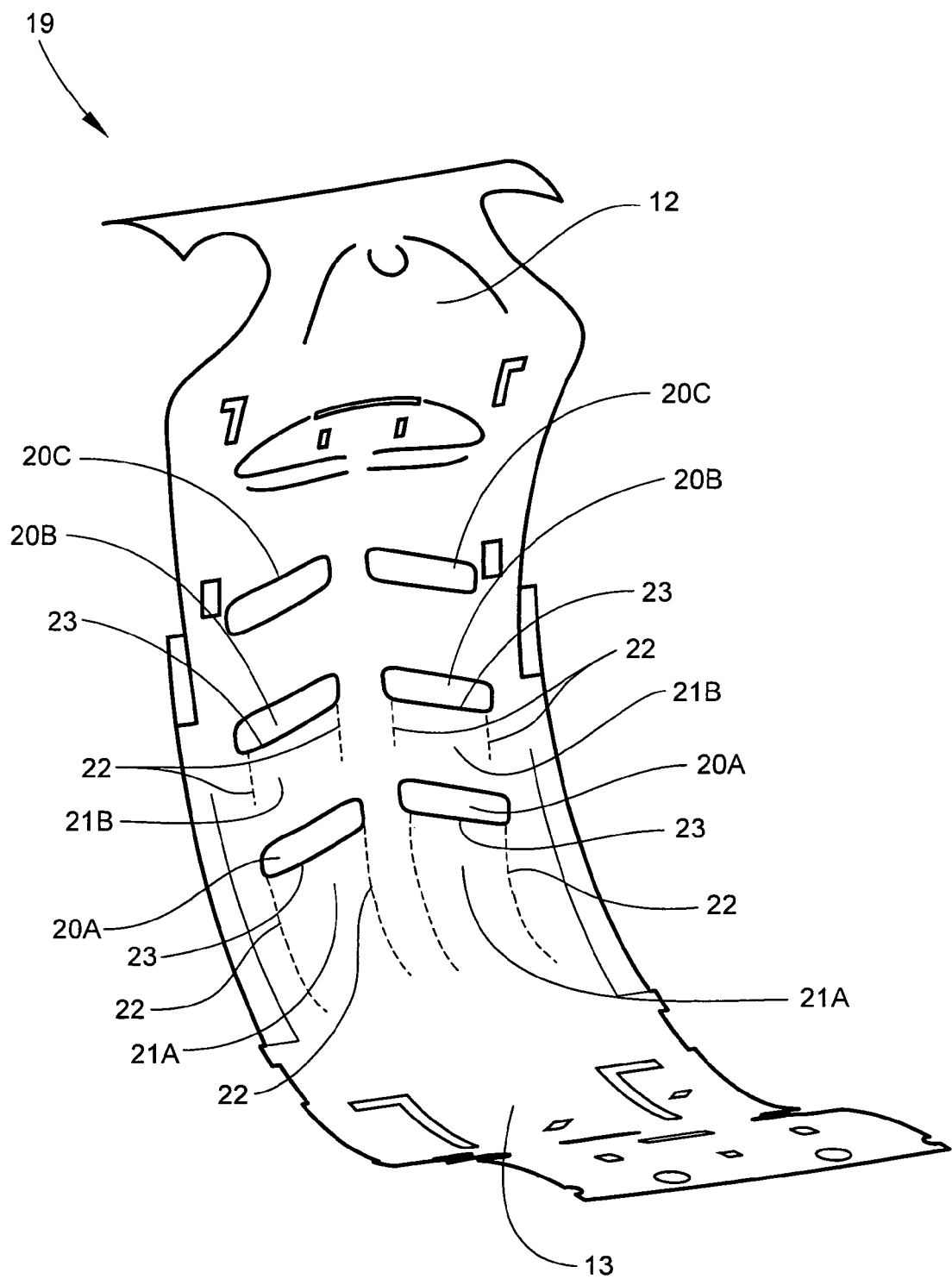
FIG. 4 is a perspective view of a center support of the seat frame of FIG. 3.

Referring to FIGS. 3 and 4, the seat frame 11 includes a pair of molded plastic opposing sides 17 and 18 connected by a molded plastic center support 19. The center support 19 has a curvature that defines the seat back 12 and the seat bottom 13. Preferably, three pairs of slots 20A, 20B, 20C are vertically positioned in the seat back 12 to allow the straps 16 to pass therethrough. As shown in FIG. 4, the slots 20A, 20B, 20C are arranged in a pair of vertical columns to allow the straps 16 to be adjusted to accommodate seat occupants of different height. The bottom slots 20A are used for the smallest seat occupants, the intermediate slots 20B for larger seat occupants, and the top slots 20C for the largest seat occupants. As such, the seat 10 can be adjusted as a seat occupant grows, or when used by a different child.

Preferably, two pairs of sacrificial energy absorbing members 21A, 21B are incorporated into the center support 19, as shown in FIG. 4. Each of the energy absorbing members 21A, 21B include an area defined by two spaced-apart weakened lines 22 of relatively thinner plastic material that extend downward from a bottom edge 23 of one of the bottom slots 20A or intermediate slots 20B, respectively. The lines 22 are weakened to allow for tearing in a sudden stop or deceleration. The lines 22 may be formed such that the degree of weakness decreases from a top of the line 22 to a bottom of the line 22. Alternatively, the lines 22 may be formed of spaced-apart perforations.

The lines 22 of the lower energy absorbing members 21A extend from the bottom pair of slots 20A, and the lines 22 of the upper energy absorbing members 21B extend from the intermediate pair of slots 21B. The length of the lines 22 extending from intermediate slots 20B is less than the lines 22 extending from bottom slots 20A. There are no energy absorbing members for the top pair of slots 20C. Such an arrangement is due to the fact that the smallest children have the greatest need for energy absorption in a vehicle's sudden stop or impact, while energy absorption is not as critical for larger children. Also, the longer upper torso of larger children cannot be allowed to move so far forward as to impact the rear of the front seat.

Figure 5:
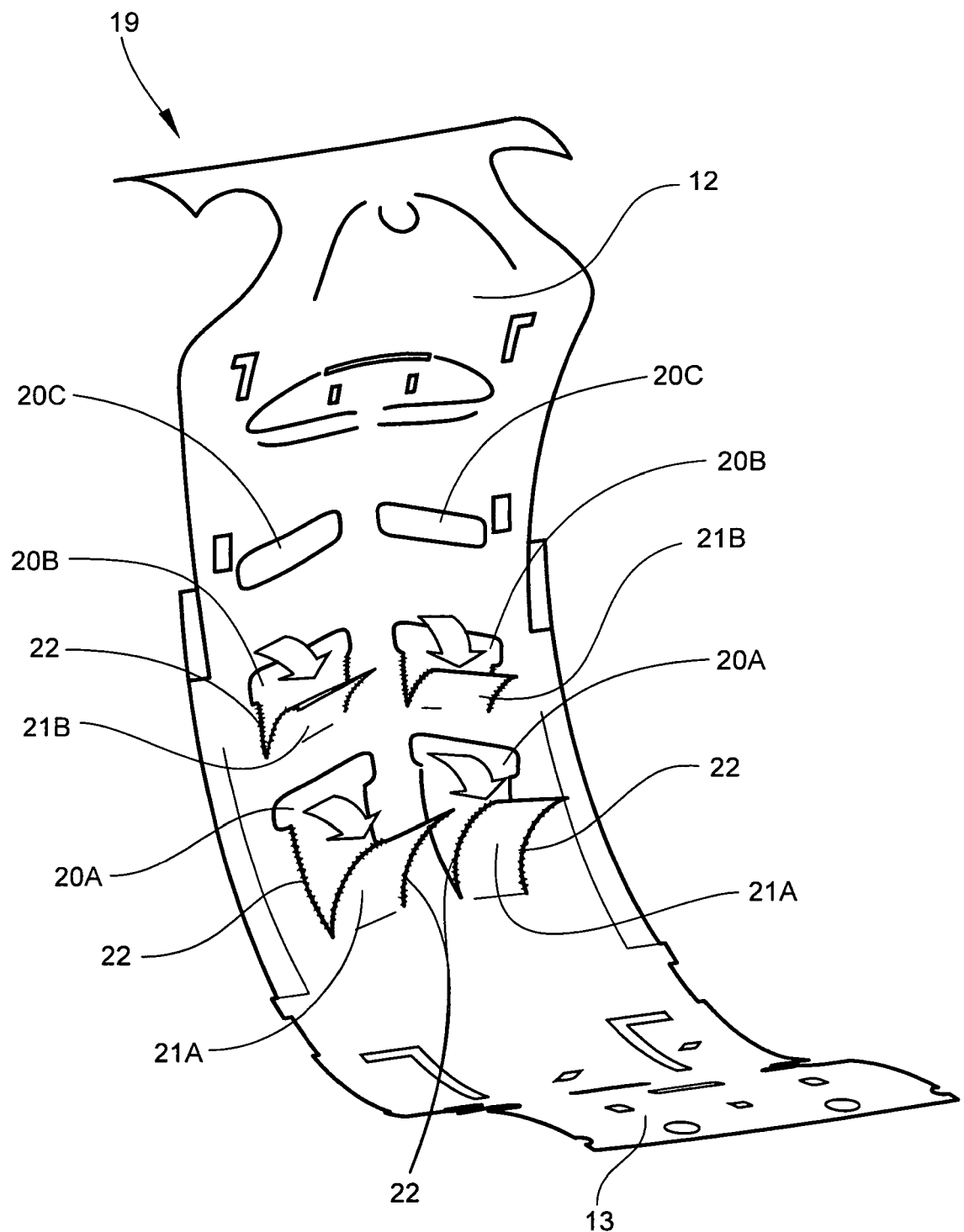
FIG. 5 is another perspective view of the center support of FIG. 4.
Figure 6:
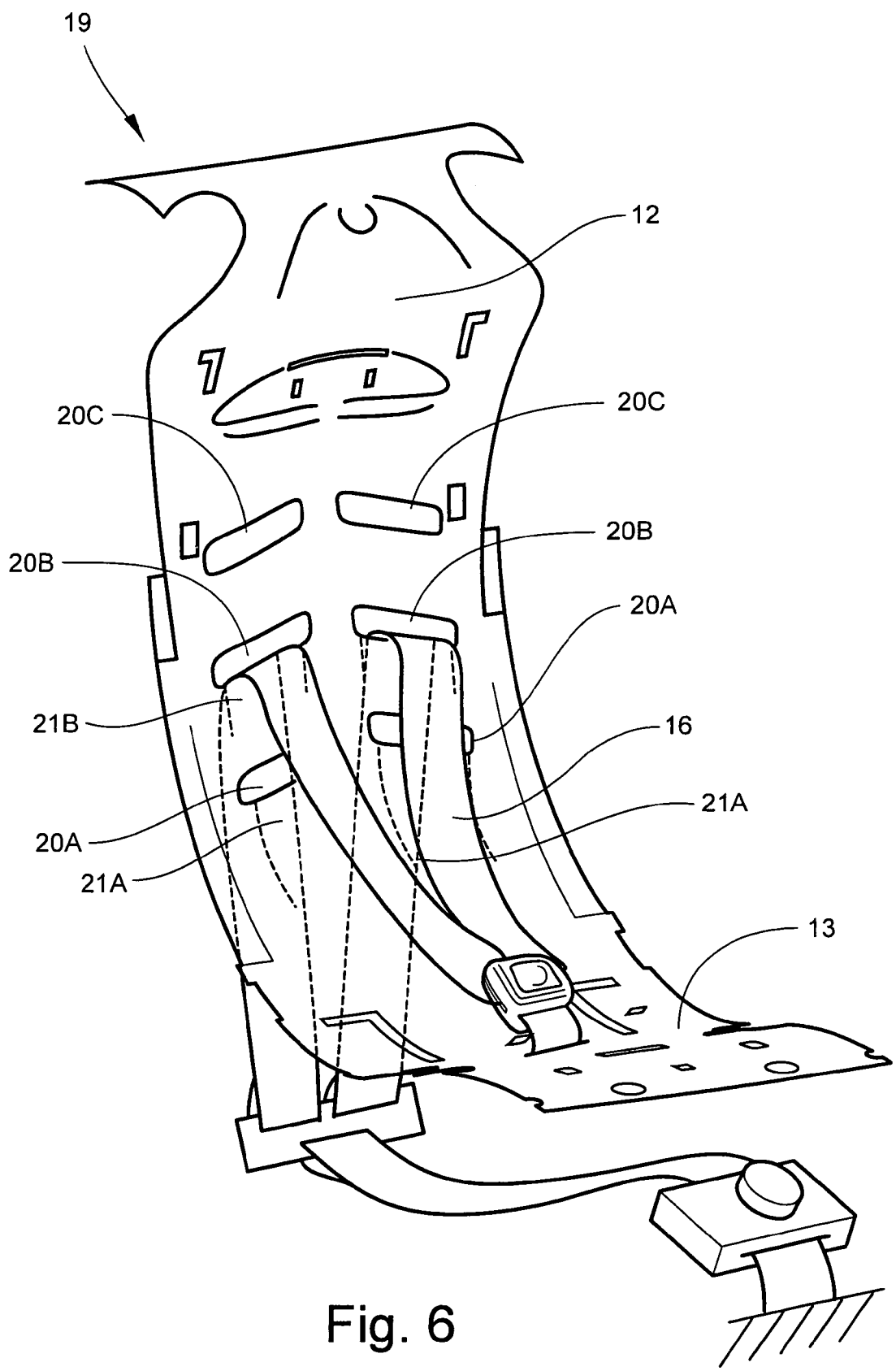
FIG. 6 is another perspective view of the center support of FIG. 4.
Figure 7:
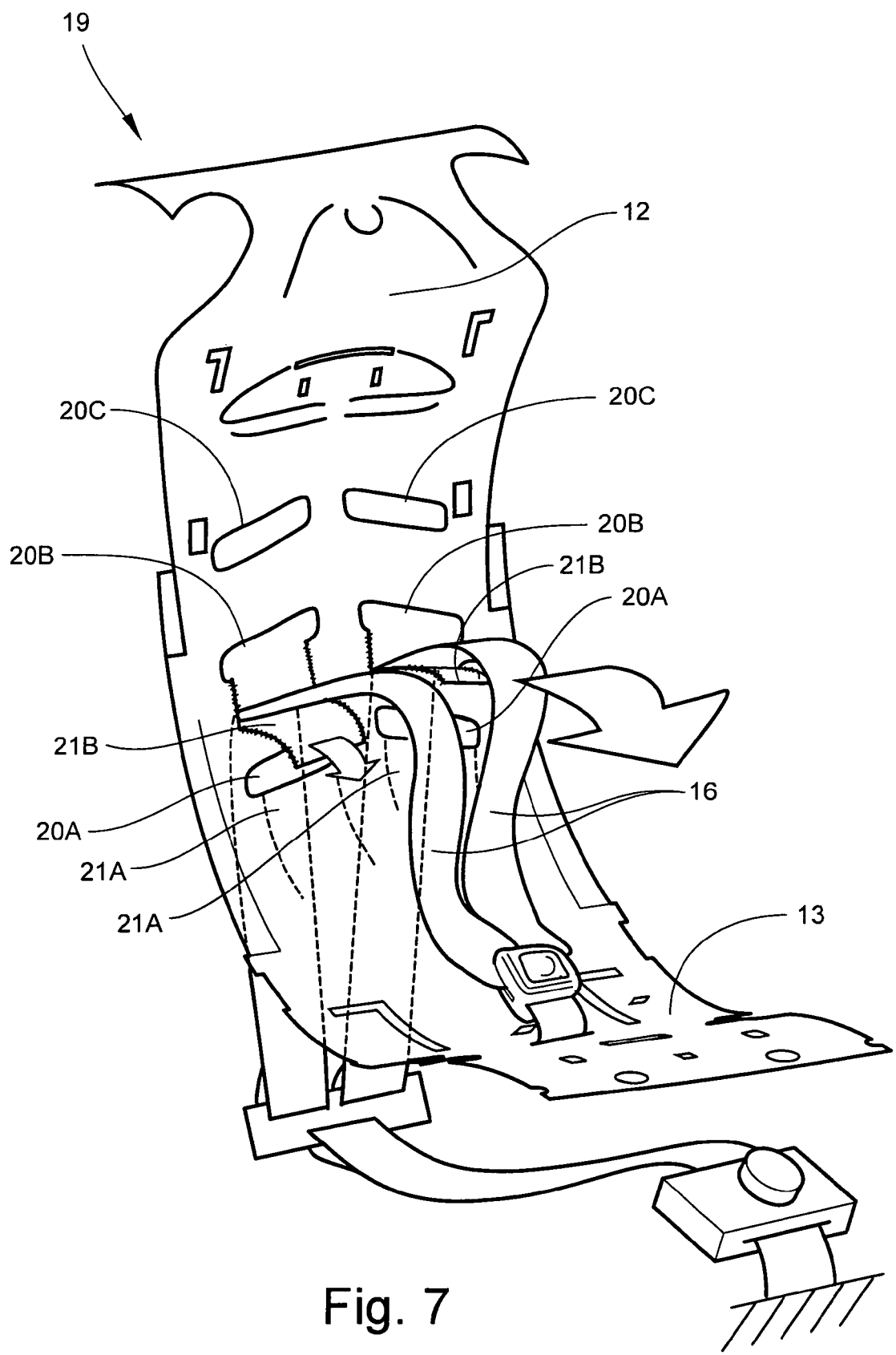
FIG. 7 is another perspective view of the center support of FIG. 4.

As shown in FIG. 5, the lines 22 allow the energy absorbing members 21A, 21B to tear away from the center support 19 at a controlled rate, decreasing the rate of acceleration of the seat occupant. This allows the energy absorbing members 21A, 21B to dissipate energy being applied to the slots 20A, 20B, respectively, by the straps 16 passing therethrough, as illustrated in FIGS. 6 and 7.

Figure 8:
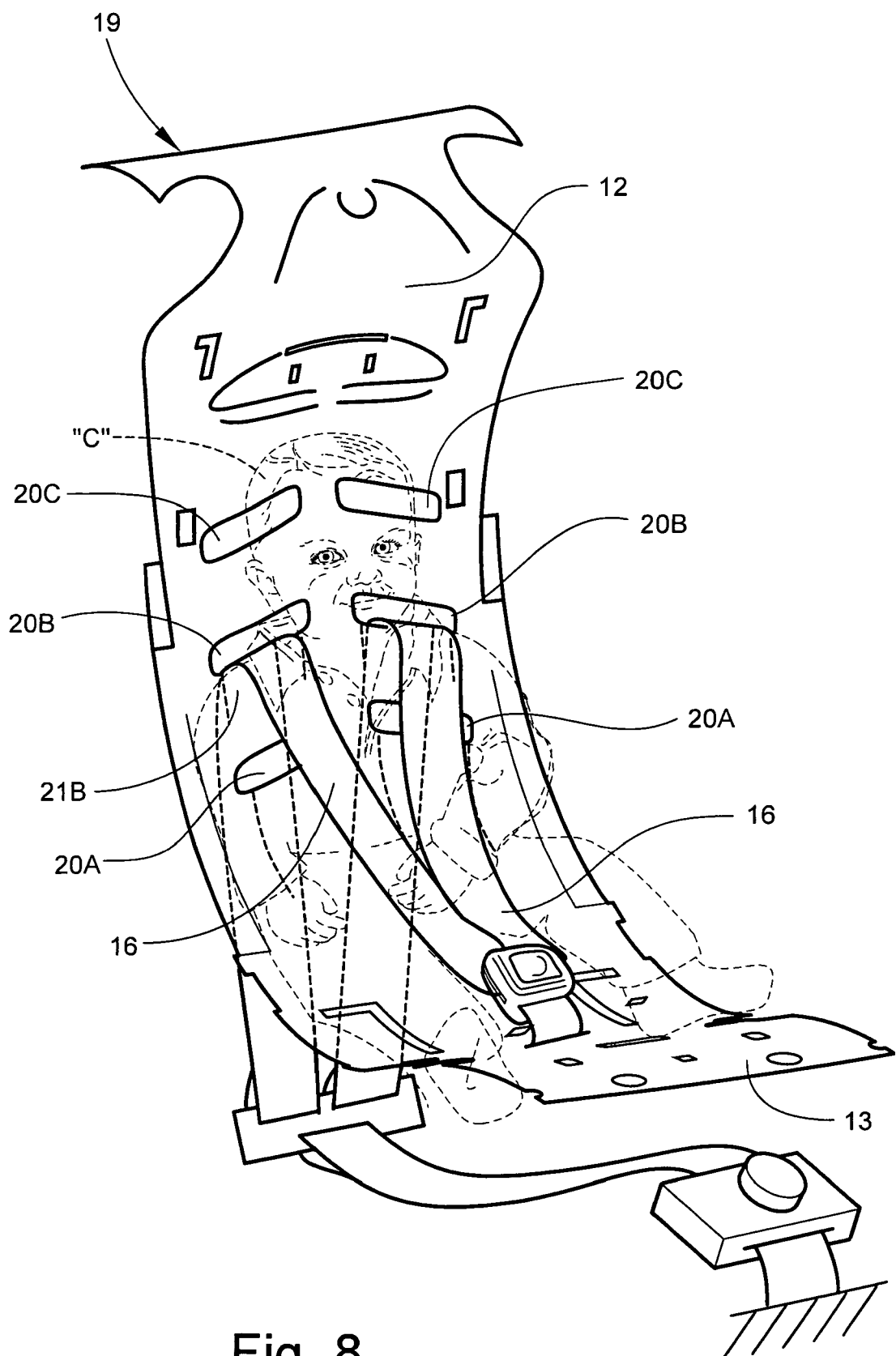
FIG. 8 is a perspective view of a child secured and positioned on the center support of FIG. 4.
Figure 9:
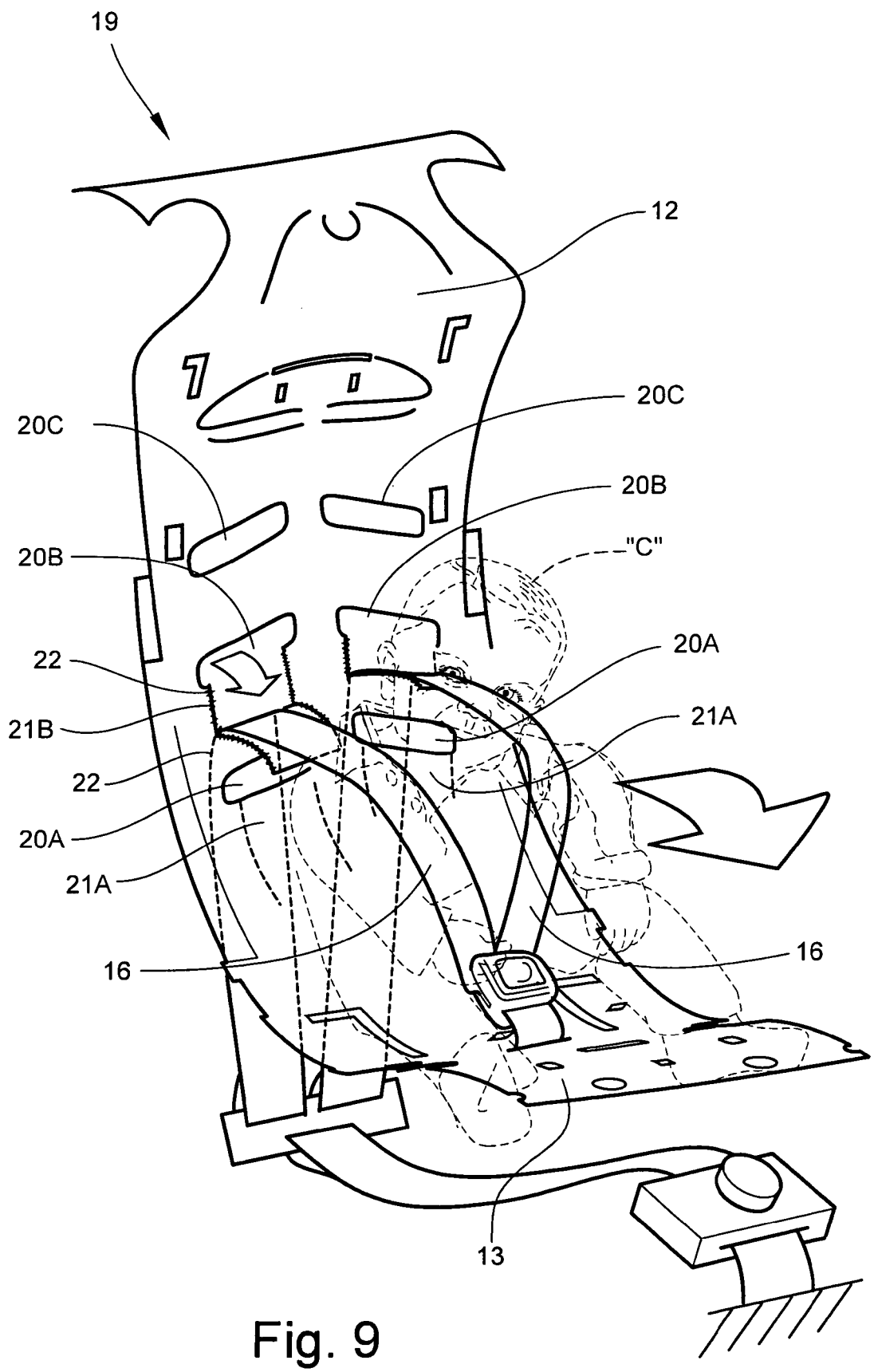
FIG. 9 is a perspective view of the child positioned on the center support of FIG. 4 and moving in a forward direction.

Referring to FIGS. 8 and 9, a seat occupant, such as a child "C", is positioned in the seat 10 on the center support 19. The child "C" is secured to the center support 19 of the seat 10 by the straps 16. As illustrated, the straps 16 are passed through the intermediate slots 20B to correspond to the size of the child "C". When a vehicle comes to a sudden stop, the forces generated by the sudden stop forces the child "C" to move in a forward direction, as shown in FIG. 9. As a result, the straps 16 restrain the child "C" to prevent the child "C" from being thrown forward. Depending on the severity of the stop, the straps of a conventional child seat may exert a force substantial enough to injure the child "C".

As shown in FIG. 9, the energy absorbing members 21B of the seat 10 allow the straps 16 to move slightly forward before completely stopping. The energy absorbing members 21B gradually tear along the lines 22 as the force exerted by the straps 16 onto the child "C" increases. As such, forward motion of the child "C" is slowed gradually before coming to a complete stop, thereby reducing the potential for injury. Center 19 is replaced after incident causing sacrifice of the energy absorbing member.

Figure 10:
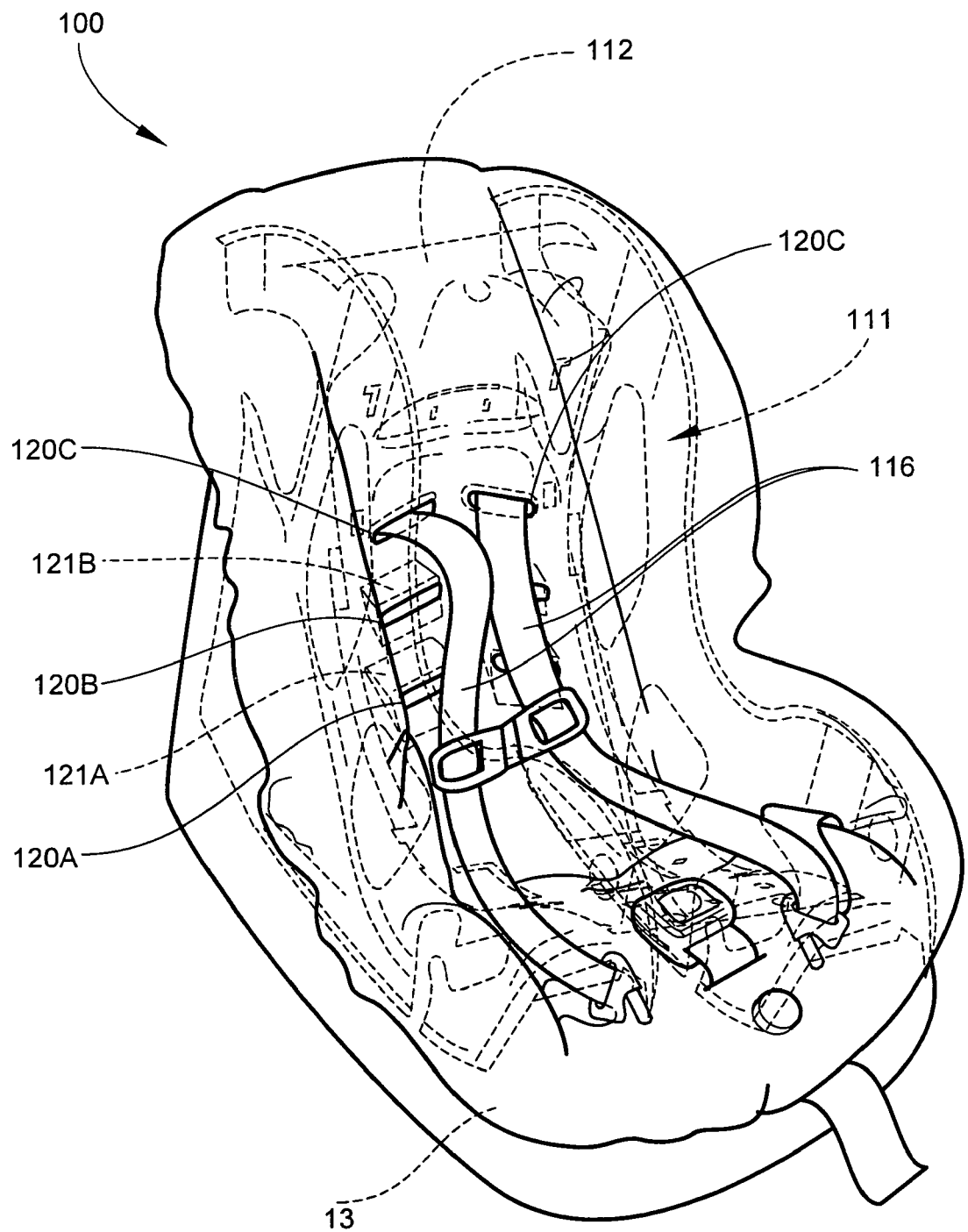
FIG. 10 is a perspective view of an energy absorbing child seat according to another preferred embodiment of the invention.
Figure 11:
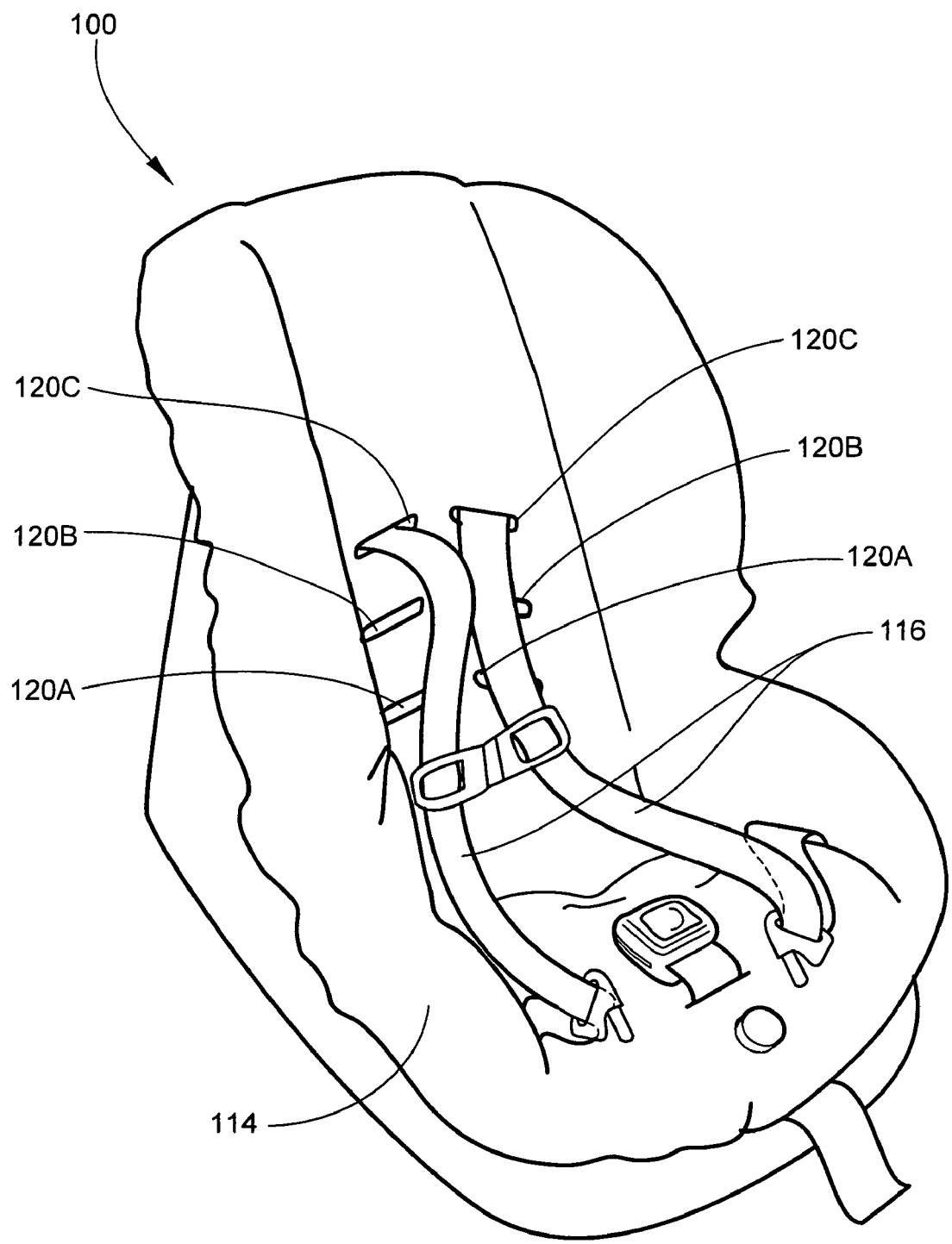
FIG. 11 is another perspective view of the energy absorbing seat of FIG. 10.

An energy absorbing child safety seat according to another preferred embodiment of the invention is illustrated in FIGS. 10 and 11, and shown generally at reference numeral 100. The seat 100 generally comprises a seat frame 111 having a seat back 112 and a seat bottom 113 and energy absorbing members 121A, 121B. A restraining harness, such as straps 116, passes through the seat back 112 and is connected to the seat frame 111 for restraining a seat occupant within the seat. A padded cover is positioned on the seat frame 111 to provide comfort to a seat occupant.

Figure 12:
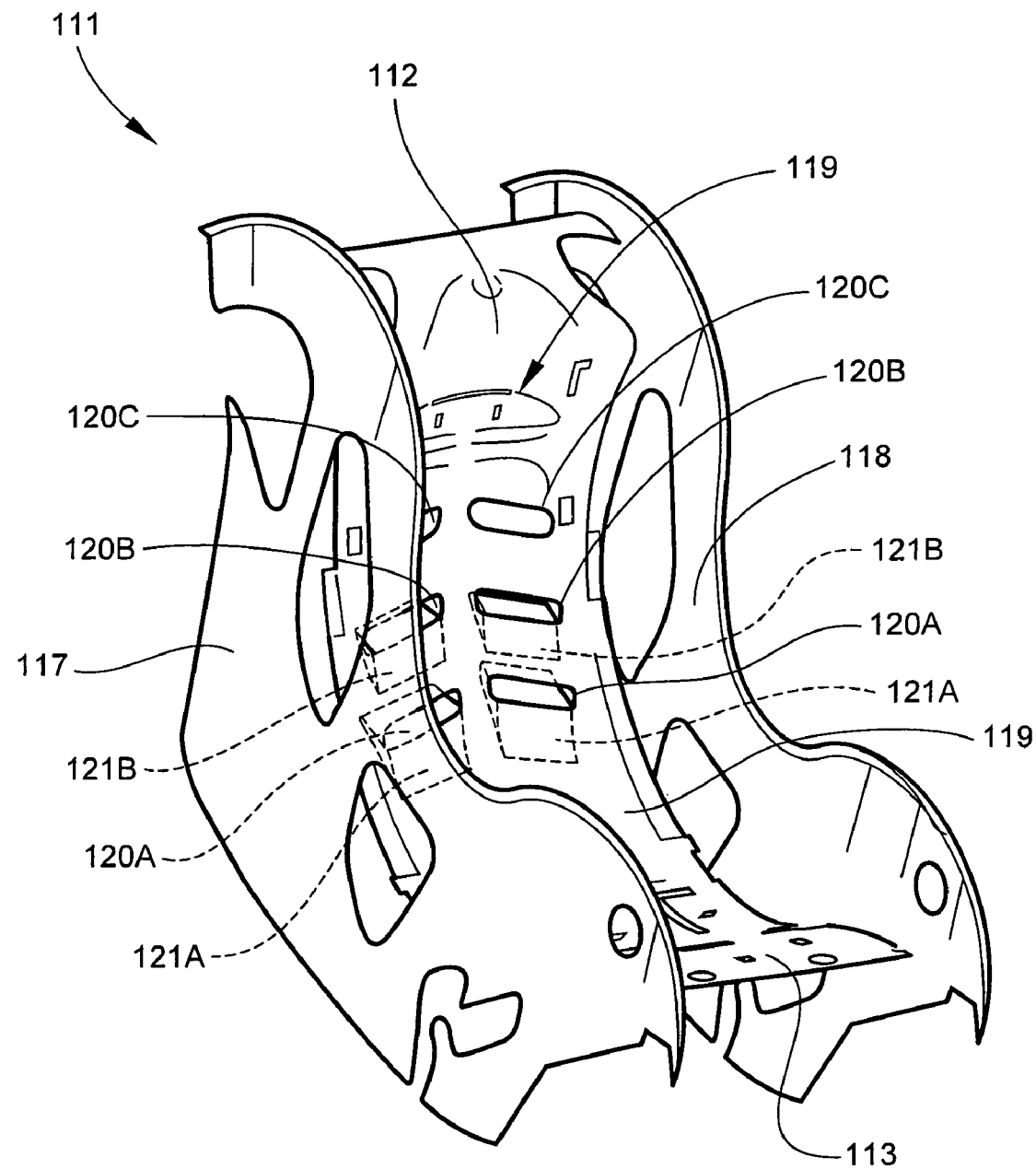
FIG. 12 is a perspective view of a seat frame of the energy absorbing seat of FIG. 10.
Figure 13:
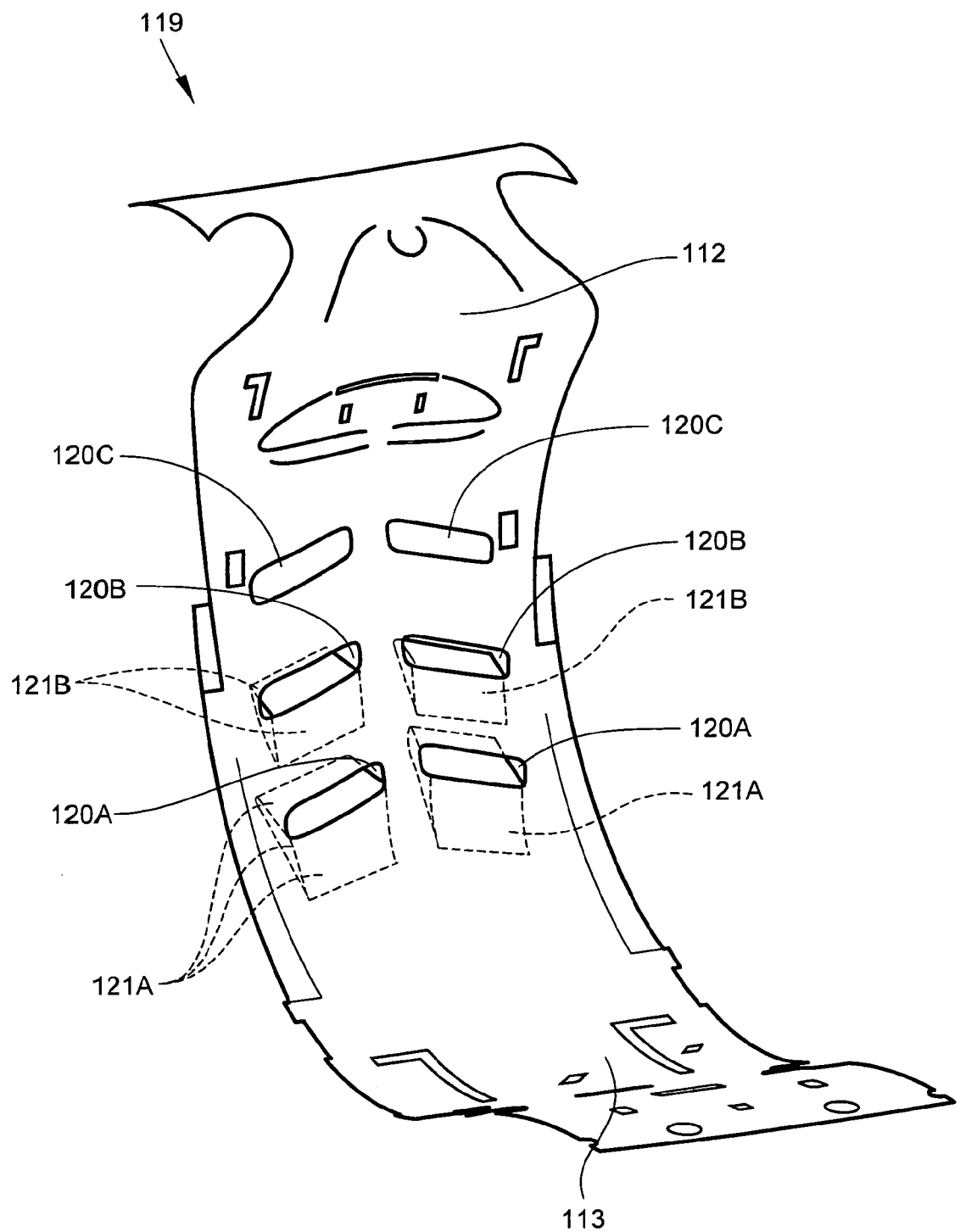
FIG. 13 is a perspective view of a center support of the seat frame of FIG. 12.
Figure 14:
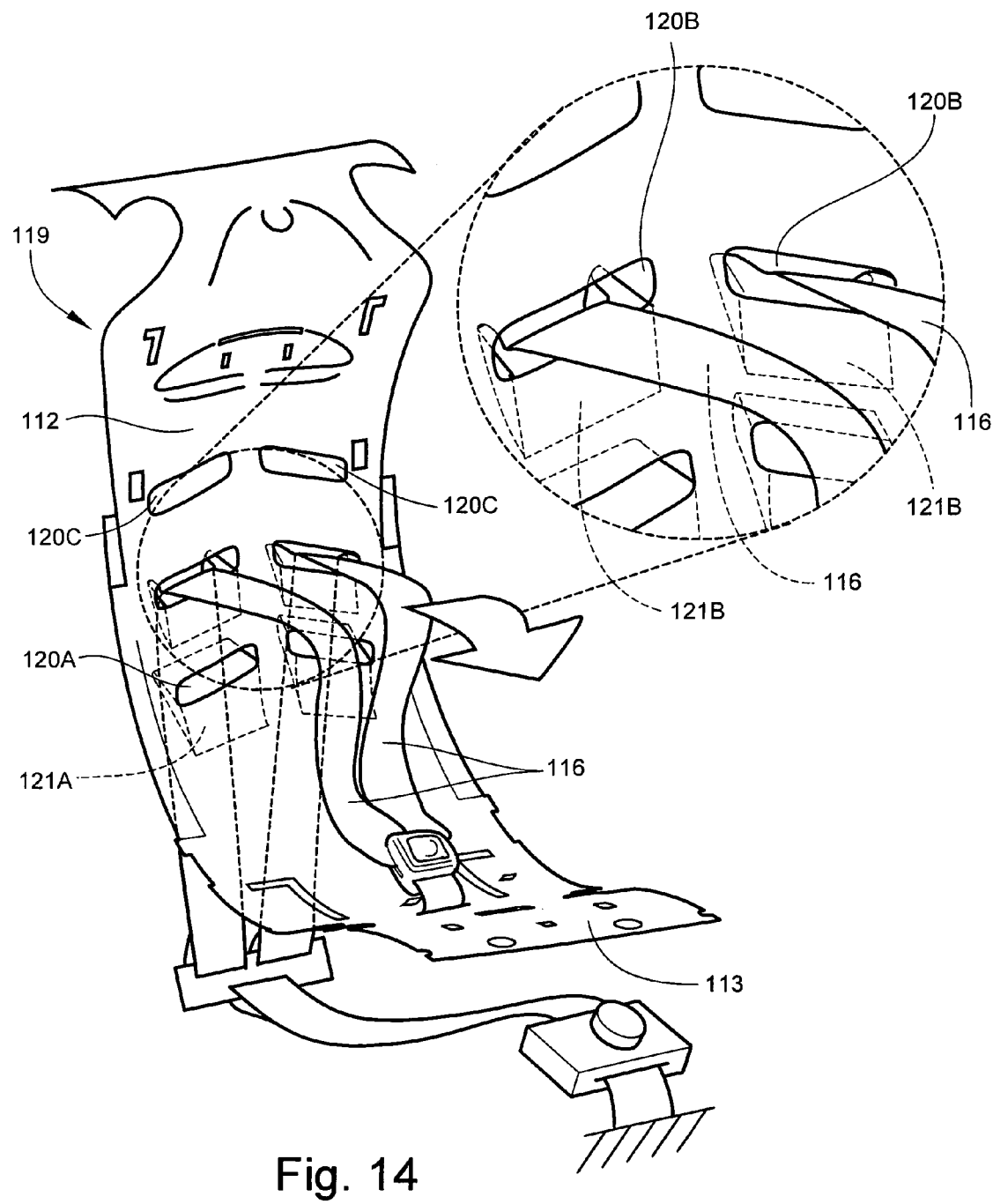
FIG. 14 is another perspective view of the center support of FIG. 13.

Referring to FIGS. 12 and 13, the seat frame 111 includes a pair of opposing sides 117 and 118 connected by a center support 119. The center support 119 has a curvature that defines the seat back 112 and the seat bottom 113. Preferably, three pairs of slots 120A, 120B, 120C are positioned on the seat back 112 to allow the straps 116 to pass therethrough, as illustrated with respect to slots 120B in FIG. 14. The slots 120A, 120B, 120C are arranged in a pair of vertical columns to allow the straps 116 to be adjusted to accommodate a seat occupant of different heights. The bottom slots 120A are used for the smallest seat occupants, the intermediate slots 120B for larger seat occupants, and the top slots 120C for the largest seat occupants. As such, the seat 10 can be adjusted as the seat occupant grows.

Figure 15:
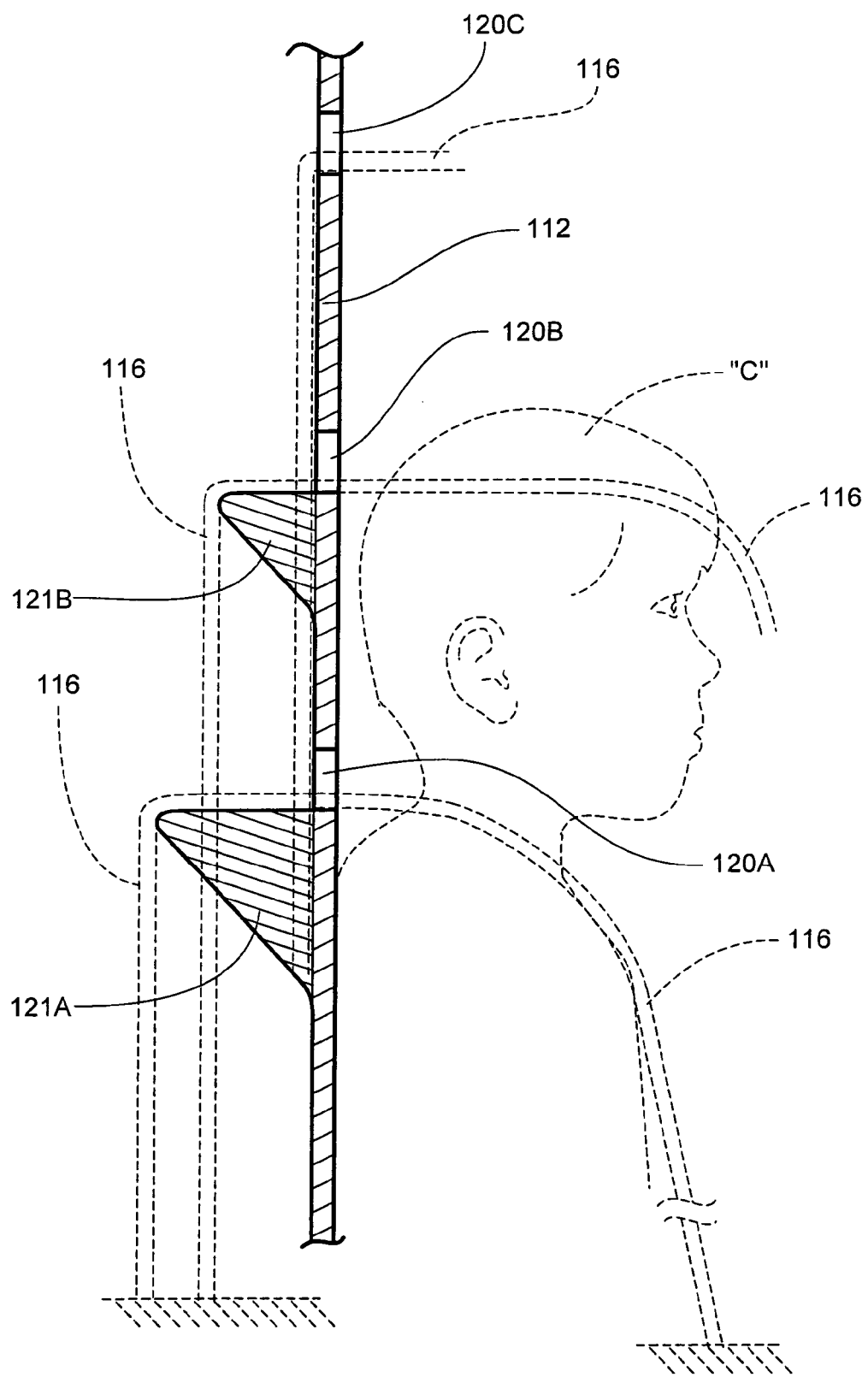
FIG. 15 is a partial cross sectional view of the energy absorbing seat of FIG. 10.

Preferably, two pairs of energy absorbing members 121A, 121B are operatively associated with the slots 120A, 120B respectively. The energy absorbing members 121A, 121B are incorporated into the center support 119, as shown in FIG. 13. Each of the energy absorbing members 121A, 121B includes a block of crushable material, such as a high density open or closed cell foam selected to provide a gradual deformation under load, preferably mounted on the rear side of the seat frame 111 proximate one of the bottom slots 120A or intermediate slots 120B, respectively, such that straps 116 can be positioned over the energy absorbing members 121A, 121B, as shown in FIG. 15. Also, the energy absorbing members 121A, 121B may be positioned at other suitable positions on the center support 119, such as under the seat bottom 113.

Preferably, the energy absorbing members 121A proximate the bottom slots 120A are larger than the energy absorbing members 121B proximate the intermediate slots 120B. There are no energy absorbing members proximate the top pair of slots 120C. Such an arrangement is due to the fact that the smallest children have the greatest need for energy absorption in a vehicle's sudden stop or impact, while energy absorption is not as critical for larger children. Also, the longer upper torso of larger children cannot be allowed to move so far forward as to impact the rear of the front seat.

Figure 16:
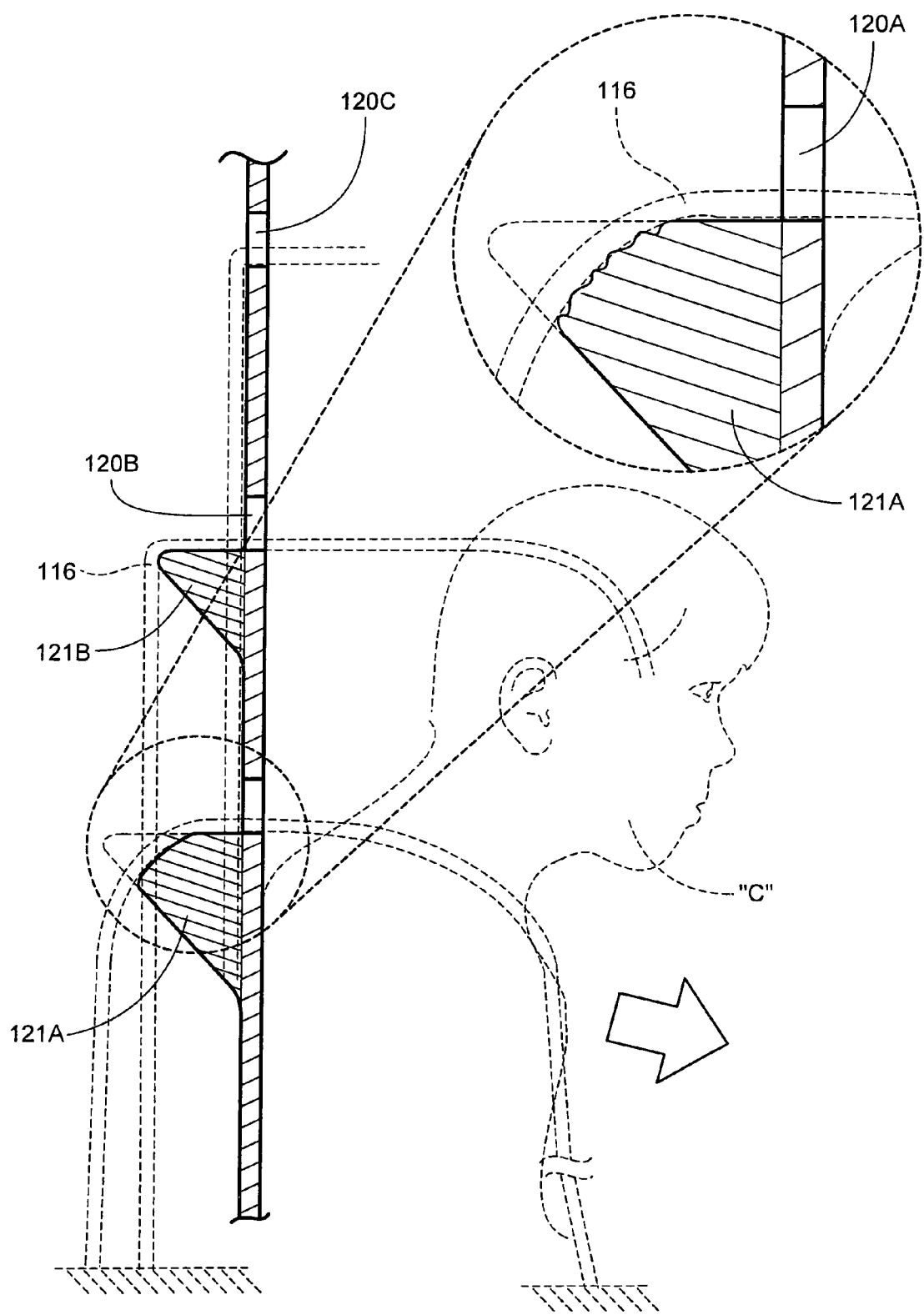
FIG. 16 is another partial cross sectional view of the energy absorbing seat of FIG. 10, showing a child moving forward.

FIGS. 15 and 16 illustrate the function of the energy absorbing member 121A in a sudden stop. FIG. 15 shows a child "C" riding at normal speed in a vehicle, and restrained by strap 116 positioned through the bottom slots 120A. As the vehicle comes to a sudden stop, inertia forces cause the child "C" to move forward against the straps 116, as shown in FIG. 16. The crushable material of the energy absorbing member 121A absorbs a significant amount of force from the strap 116. The energy absorbing member 121A allows the strap 116 to move slightly forward before coming to a complete stop by contacting the rear side of the seat frame 111. As such the child "C" is allowed to come to a more gradual stop, and is less likely to suffer an injury in an accident.

Figure 17:
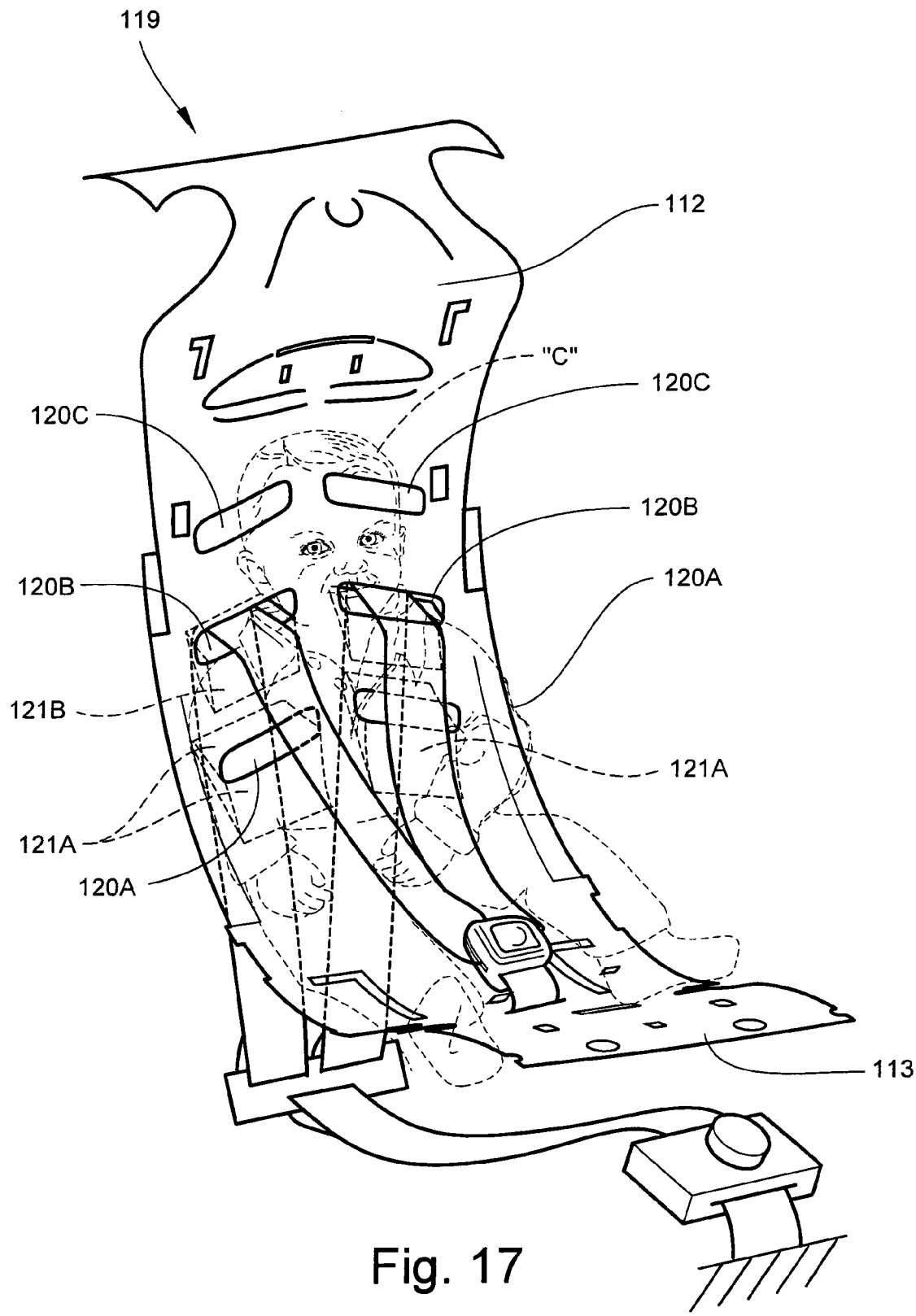
FIG. 17 is a perspective view of a child secured and positioned on the center support of FIG. 13.
Figure 18:
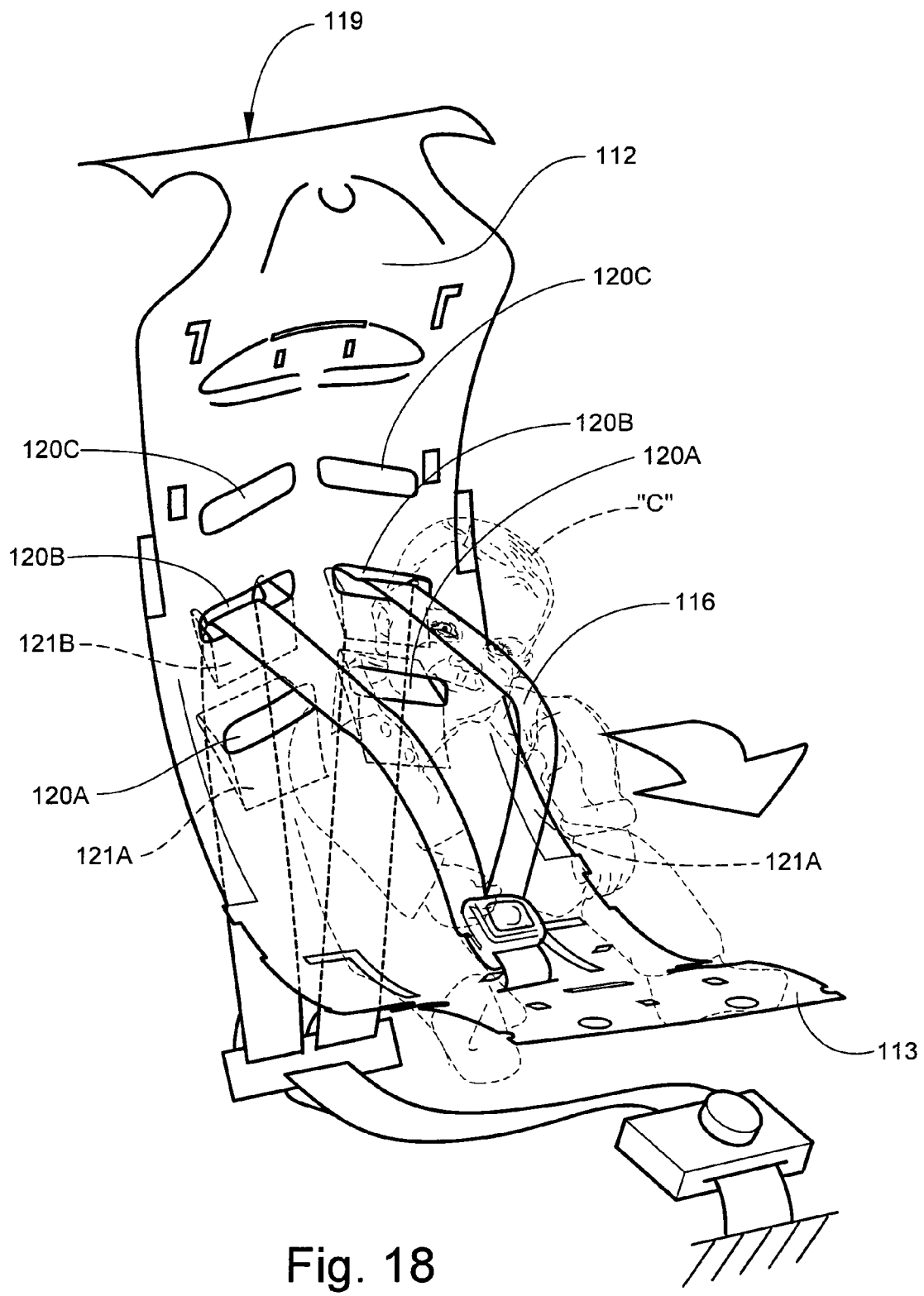
FIG. 18 is a perspective view of the child positioned on the center support of FIG. 13, and moving in a forward direction.

FIGS. 17 and 18 illustrate the use of the energy absorbing members 121B proximate the intermediate slots 120B. The child "C" is positioned in the seat 100 on the center support 119, as shown in FIG. 17. The child "C" is secured to the center support 119 of the seat 100 by the straps 116. The straps 116 are passed through the intermediate slots 120B to correspond to the size of the child "C". When the vehicle comes to a sudden stop, the forces generated by the sudden stop forces the child "C" to move in a forward direction, as shown in FIG. 18. The crushable material of the energy absorbing members 121B absorb a significant amount of the force exerted on the child by straps 116.

The invention has the potential of decreasing the g-forces applied to a child during a sudden stop or deceleration from approximately 60 g's to approximately 35-40 g's.

A child safety seat, and a method of using same are described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A seat, comprising:
   (a) a strap for restraining a seat occupant;
   (b) a seat frame having a seat back that includes a plurality of slots positioned in spaced-apart relation in a mid portion of the seat back such that each respective slot of the plurality of slots is configured for selectively receiving the strap; and
   (c) the seat frame further including a plurality of energy absorbing members, each respective energy absorbing member of the energy absorbing members being positioned on the seat back and being operatively associated with an respective slot for reducing the amount of force applied by the strap to the seat occupant during a sudden deceleration of the seat, wherein the plurality of energy absorbing members are adapted to progressively decrease in energy absorbing capacity from a bottom portion of the seat back to a top portion of the seat back.

2. The seat according to claim 1, wherein the plurality of energy absorbing members are positioned between a rearward side of the seat frame and the strap, and the respective energy absorbing member comprises a crushable material adapted for progressive crushing during a sudden deceleration, whereby the strap is allowed to move forward, at a controlled rate, a predetermined distance during the sudden deceleration of the seat.

3. The seat according to claim 2, wherein the plurality of energy absorbing members are positioned on the rearward side of the seat back adjacent to its associated slot.

4. The seat according to claim 1, wherein the respective energy absorbing member is mounted on a rearward side of the seat frame adjacent to the respective slot.

5. The seat according to claim 1, wherein the respective energy absorbing member includes an area of reduced resistance to application of a force, and the area extends from a bottom edge of the respective slot and is adapted for separation from the seat back during a sudden deceleration, whereby the strap is allowed to move forward, at a controlled rate, a predetermined distance during the sudden deceleration of the seat.

6. The seat according to claim 5, wherein the plurality of energy absorbing members are arranged such that each decreases in size from the bottom portion of the seat back to the top portion of the seat back.

7. The seat according to claim 1, wherein the plurality of slots includes a bottom pair of slots, an intermediate pair of slots positioned above the bottom pair of slots, and a top pair of slots positioned above the intermediate pair of slots, and further wherein the seat back includes a first pair of the energy absorbing members positioned adjacent the bottom pair of slots, and a second pair of the energy absorbing members positioned adjacent the intermediate pair of slots.

8. The seat according to claim 7, wherein the first pair of energy absorbing members have greater energy absorbing capacity than the second pair of energy absorbing members.

9. The seat according to claim 1, wherein the energy absorbing member comprises an elongated weakness area extending from a bottom edge of the slot and adapted for progressive separation from the seat back during a sudden deceleration, whereby the strap is allowed to move forward, at a controlled rate, a predetermined distance during the sudden deceleration of the seat.

10. A seat, comprising:
    (a) a seat frame having a seat back and a seat bottom, the seat back having an upper pair of slots, an intermediate pair of slots, and a bottom pair of slots for receiving a strap for restraining a seat occupant;
    (b) the seat frame further including a first pair of energy absorbing members operatively associated with the bottom pair of slots and a second pair of energy absorbing members operatively associated with the intermediate pair of slots to allow the strap to move forward, at a controlled rate, a predetermined distance during a sudden deceleration of the seat, thereby reducing an amount of force applied by the strap to the seat occupant; and
    (c) wherein the first pair of energy absorbing members have a greater energy absorbing capacity than the second pair of energy absorbing members.

11. The seat according to claim 10, wherein the first and second pairs of energy absorbing members include an area of reduced resistance to application of a force and the area of reduced resistance extends from a bottom edge of the slot, and is adapted for separation from the seat back during a sudden deceleration, whereby the strap is allowed to move forward, at a controlled rate, a predetermined distance during the sudden deceleration of the seat.

12. The seat according to claim 10, wherein the first and second pairs of energy absorbing members are positioned between a rearward side of the seat frame and the associated slot, the first and second pairs of energy absorbing members comprising a crushable material adapted for progressive crushing during a sudden deceleration, whereby the strap is allowed to move forward, at a controlled rate, a predetermined distance during the sudden deceleration of the seat.

* * * * *